US005752693A

United States Patent [19]

Brisco

[11] Patent Number: 5,752,693

[45] Date of Patent: May 19, 1998

[54] RETRACT CLAMP APPARATUS

[75] Inventor: David P. Brisco, Emporia, Kans.

[73] Assignee: Vektek, Inc., Emporia, Kans.

[21] Appl. No.: 705,957

[22] Filed: Aug. 30, 1996

[51] Int. Cl.$^{6}$ .......... B23Q 3/08

[52] U.S. Cl. .......... 269/24; 269/32

[58] Field of Search .......... 269/20, 22, 27, 269/32, 134, 135, 136, 137, 138, 157, 160, 162, 163, 217, 229, 233, 234, 94

[56] References Cited

U.S. PATENT DOCUMENTS

| | | | |
|---|---|---|---|
| 3,578,306 | 5/1971 | Smith | 269/22 |
| 3,700,227 | 10/1972 | Sessody | 269/157 |
| 4,509,298 | 4/1985 | Klievoneit | 269/22 |

FOREIGN PATENT DOCUMENTS

| | | | |
|---|---|---|---|
| 3802985 | 8/1988 | Germany | 269/20 |
| 509391 | 4/1976 | U.S.S.R. | 269/234 |
| 933366 | 6/1982 | U.S.S.R. | 269/234 |
| 1004068 | 3/1983 | U.S.S.R. | 269/32 |

*Primary Examiner*—Robert C. Watson

*Attorney, Agent, or Firm*—Hovey, Williams, Timmons & Collins

[57] ABSTRACT

A retract clamp apparatus is provided for supporting a work piece on a fixture. The apparatus includes a body that is secured to the support surface of the fixture, and an arm received in the bore and presenting an outer end adapted to engage the work piece. A piston within the body shifts the arm between a retracted position and an extended position, and the arm is supported for longitudinal movement with the piston and for pivotal movement about a pivot axis that is transverse to the central axis defined by the bore. The body includes structure for preventing the arm from pivoting relative to the body in the retracted position and for permitting limited pivoting of the arm about the pivot axis when the arm is shifted longitudinally a predetermined distance toward the extended position.

6 Claims, 2 Drawing Sheets

RETRACT CLAMP APPARATUS

BACKGROUND OF THE INVENTION

1. Field of the Invention

The present invention relates generally to fluid-actuated work support devices, and more particularly to a hydraulic retract clamp apparatus having a clamp arm that shifts longitudinally and pivots into and out of engagement with a work piece that is to be supported on a fixture.

2. Discussion of the Prior Art

It is known to provide a plurality of hydraulic swing clamps on a fixture for use in securing a work piece in place so that a machining operating can be performed on the piece while it is supported on the fixture. However, in certain applications it is not possible to employ these widely used work support devices, e.g. where space restrictions or oddly shaped work pieces restrict swinging movement of the clamp arms of such devices. In such applications, it is known to employ a retract clamp apparatus having a clamp arm that extends out from the clamp body and pivots down onto the work piece in order to hold the work piece against the support surface of the fixture.

An example of a known retract clamp apparatus includes an upstanding body having a lower mounting surface adapted to be supported on the fixture, and a vertical bore within which a piston is received for relative vertical movement between retracted and extended positions. An elongated arm is supported on the body above the piston and presents an outer arm adapted to clamp the work piece when the piston is extended. The arm is connected to the piston in such a way that vertical movement of the piston is transmitted to the arm, shifting the arm laterally in a direction limited by the body. At a predetermined point along the path of travel of the arm, an oblique force is exerted on the arm that pivots it about a horizontal axis, pressing the outer end of the arm against the work piece. Thus, the desired extension and pivoting action is achieved.

Numerous problems arise in the use of the known retract clamp construction. Most significantly, the mechanism employed in the device to achieve both extension and pivoting movement of the arm is complex, employing a number of parts that require a relatively large space in an environment where space is often at a premium. In addition, because the body presents an upright profile, such devices can only be used on fixtures where they will not get in the way of the machine tool with which the fixture is to be used. Such problems present the need for a relatively low-profile retract clamp apparatus that provides the same clamping action from within a smaller body.

OBJECTS AND SUMMARY OF THE INVENTION

It is an object of the present invention to provide such a retract clamp, wherein a relatively simple construction permits the apparatus to be assembled in a small body having a very low profile relative to existing devices.

It is another object of the invention to provide a retract clamp apparatus that is constructed of relatively few parts, simplifying assembly and reducing the cost thereof.

In accordance with these and other objects evident from the following description of a preferred embodiment of the invention, a retract clamp apparatus is provided for supporting a work piece on a fixture, and includes a body having a mounting surface by which it is supported on the fixture, and a longitudinally extending bore defining a central longitudinal axis that is parallel to the mounting surface. A piston is received in the bore for relative longitudinal movement between a retracted position and an extended position, and an elongated arm is mounted on the body for longitudinal movement with the piston and for pivotal movement about a pivot axis that is transverse to the central longitudinal axis and parallel to the mounting surface.

The body of the inventive retract clamp apparatus includes a guide means for preventing the arm from pivoting relative to the body in the retracted position and for permitting limited pivoting of the arm about the pivot axis when the arm is shifted longitudinally a predetermined distance toward the extended position. In addition, the apparatus includes a shifting means for shifting the piston and arm back and forth between the retracted and extended positions.

By providing a retract clamp apparatus in accordance with the present invention, numerous advantages are realized. For example, by providing a body that defines a cylinder that extends parallel to the mounting surface, the profile of the apparatus is reduced dramatically relative to conventional devices, enabling use of the apparatus in height-restricted applications where such prior art constructions could not work.

In addition, by providing a clamp apparatus in which the arm and piston extend and retract together longitudinally of the body, fewer parts are required than in the known constructions, simplifying assembly of the apparatus and further reducing the size of the body required to house the parts. As such, the inventive apparatus has application in tight spaces where retract clamps are typically not thought of as possible clamping solutions, possessing much greater utility than has been possible in the past.

BRIEF DESCRIPTION OF THE DRAWING FIGURES

The preferred embodiment of the present invention is described in detail below with reference to the attached drawing figures, wherein.

DETAILED DESCRIPTION OF THE PREFERRED EMBODIMENT

Figure 1:
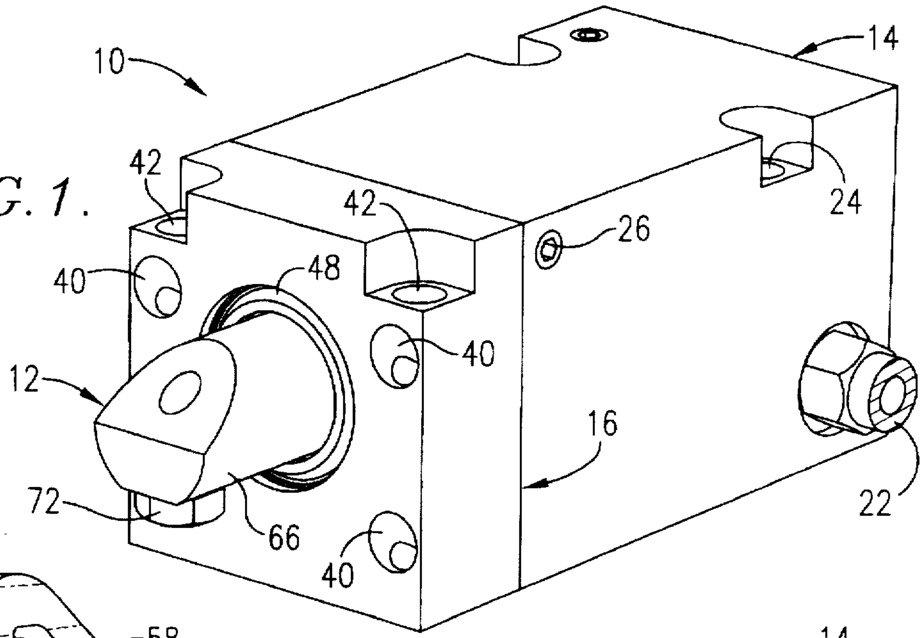
FIG. 1 is a perspective view of a retract clamp apparatus constructed in accordance with the preferred embodiment.

A retract clamp constructed in accordance with the preferred embodiment is illustrated in FIG. 1, and broadly includes a body assembly 10 adapted to be supported on a fixture, and a clamp arm 12 that can be extended from the body assembly and pivoted into and out of engagement with a work piece that is to be supported on the fixture.

Figure 2:
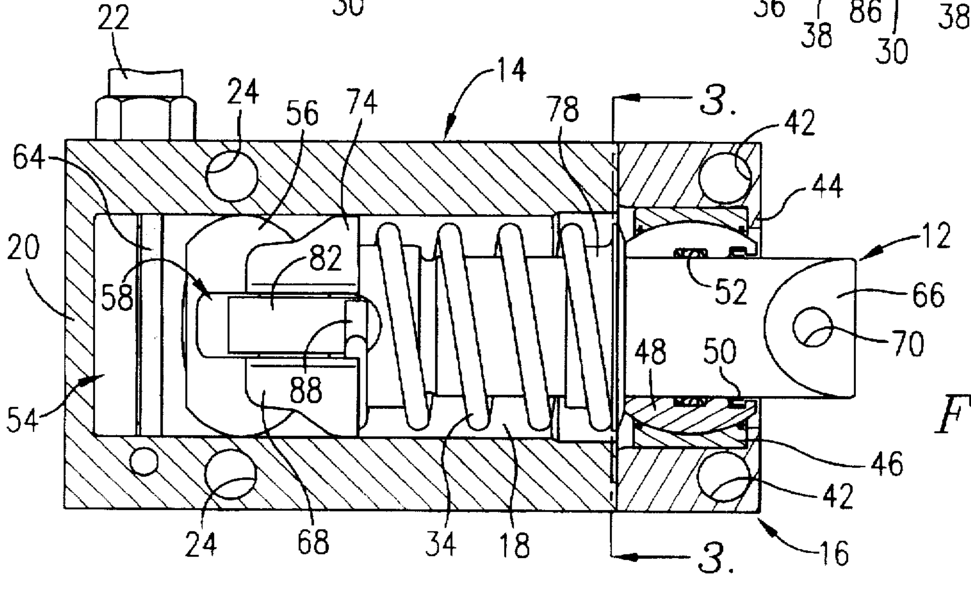
FIG. 2 is a sectional view of the apparatus, illustrating the top plan of a piston and arm assembly forming a part thereof.

The body assembly includes a body 14 and a mount 16, both of which are formed of steel or other suitable metal. The body presents a low profile, having a height equal to the width thereof and being deeper from front to back than from top to bottom. As shown in FIG. 2, a cylindrical bore 18 extends into the body from the front end thereof, and terminates short of the rear wall 20 of the body. The bore is of uniform diameter, defining a central longitudinal axis.

Figure 6:
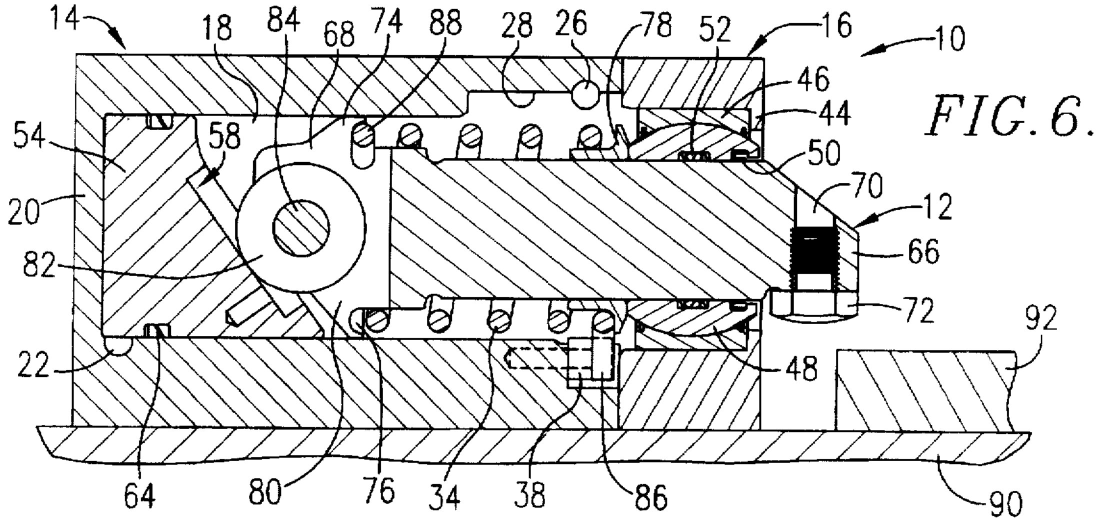
FIG. 6 is a sectional view of the apparatus, illustrating the piston and arm assembly in a retracted position.

At least one port 22 is formed in the body to provide fluid communication between the bore and a conventional source of hydraulic fluid. Preferably, three ports are provided, one in each of the rear and bottom walls, and in one of the side walls, of the body. The ports permit the apparatus to be connected to the source of hydraulic fluid in any of several different configurations to accommodate particular fixture designs. Plugs are provided for plugging shut any of the ports that are not used in a particular application. A pair of holes 24 are formed in and extend through the body adjacent the rear end and are adapted for receipt of fasteners that secure the apparatus on the fixture. Additionally, as shown in FIG. 6, a ventilation hole 26 is formed in one of the side walls and communicates with the bore to provide ventilation during operation of the apparatus.

Figure 3:
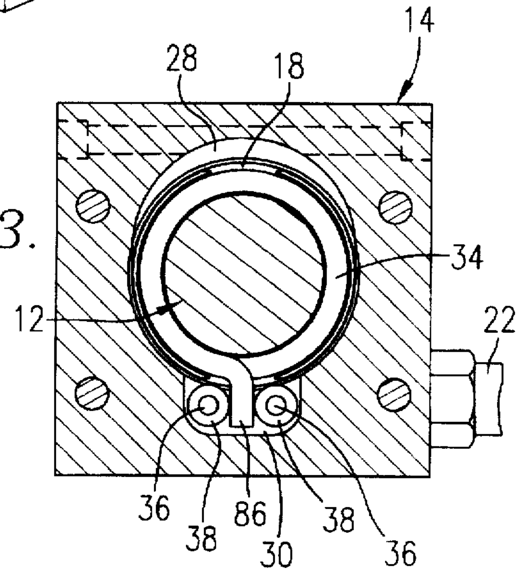
FIG. 3 is a sectional view taken along line 3—3 of FIG. 2.

A recess 28 is formed within the body and extends radially outward from the bore and inward from the front end of the body. The recess presents a crescent shape in cross section, as shown in FIG. 3, possessing a cylindrical circumferential surface that defines a central longitudinal axis that is parallel to and spaced directly above the longitudinal axis of the bore. As such, the recess presents a step along the upper surface of the bore adjacent the front end of the body.

Figure 5:
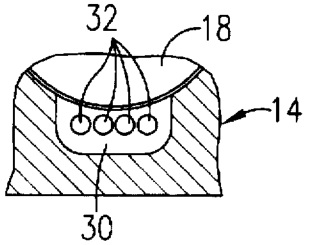
FIG. 5 is a fragmentary view of a body forming a part of the apparatus, illustrating a plurality of mounting holes forming a part thereof.

As shown in FIG. 5, a small cutout 30 is formed in the front end of the body in communication with the bore, and four axially extending holes 32 extend into the face of the cutout. As described below, and a shown in FIG. 3, the cutout is sized for receipt of the front end of a compression spring 34, and the holes receive pins 36 that, together with bushings 38, position the front end of the spring relative to the body and prevent the front end of the spring from turning during use of the apparatus.

As shown in FIG. 1, the mount 16 is formed of steel or other suitable metal, and is of the same height and width as the body 14. Four axially extending holes 40 extend through the mount and into the front end of the body adjacent the corners thereof for receiving threaded fasteners that secure the mount on the front end of the body. Two additional holes 42 extend through the mount from top to bottom and, like the holes 24, are adapted to receive fasteners that secure the apparatus in place on a fixture.

As shown in FIG. 2, the mount includes a central bore aligned with the bore of the body, and the longitudinal axes of the two bores are collinear. An inward directed, circumferential flange 44 is provided at the front end of the mount, and defines a seat against which a bearing race 46 is received. The bearing race includes a cylindrical outer surface sized for receipt in the mount 16, and presents an inner surface that is spherical. A bearing 48 is received in the race and includes a spherical outer surface that mates with the inner surface of the race to permit universal pivoting of the bearing within the race.

The bearing 48 is provided with a cylindrical inner surface sized for receipt of the arm 12, and two axially spaced, circumferentially extending grooves are formed in the inner surface. A conventional wiper 50 is fitted in the front groove of the bearing, and an O-ring 52 is provided in the rear groove. Preferably, the O-ring is sandwiched between a pair of back-up rings that are also received in the rear groove. By providing this construction, the arm is permitted to shift along its axis within the bearing, and can be pivoted with the bearing relative to the body.

Figure 4:
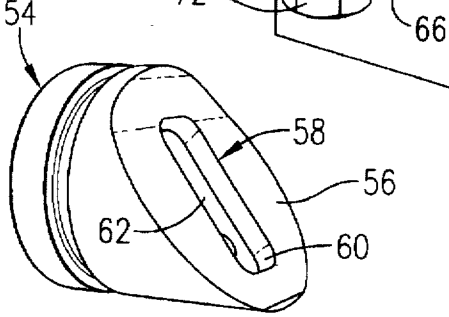
FIG. 4 is a perspective view of the piston.

A cylindrical piston 54 formed of steel or other suitable metal is received in the bore of the body, and presents an outer diameter corresponding to the diameter of the bore. The piston 54 presents a rear face that is square with the bore, i.e. perpendicular to the longitudinal axis of the bore, and an oblique front face 56, shown in FIG. 4. When the piston is received in the bore, the plane defined by the front face of the piston intersects the plane defined by the rear face along a horizontal line that is disposed above and perpendicular to the longitudinal axis of the bore. An elongated race 58 is formed in the front face 56 and presents a pair of laterally spaced, parallel side walls 60 and a bottom wall 62 that is parallel to the front face. The race defines a central axis that is disposed in a vertical plane that also includes the longitudinal axis of the bore. Preferably, the bottom wall 62 of the race and the front face 56 of the piston are disposed at an angle of about 54° relative to the longitudinal axis of the bore.

Figure 8:
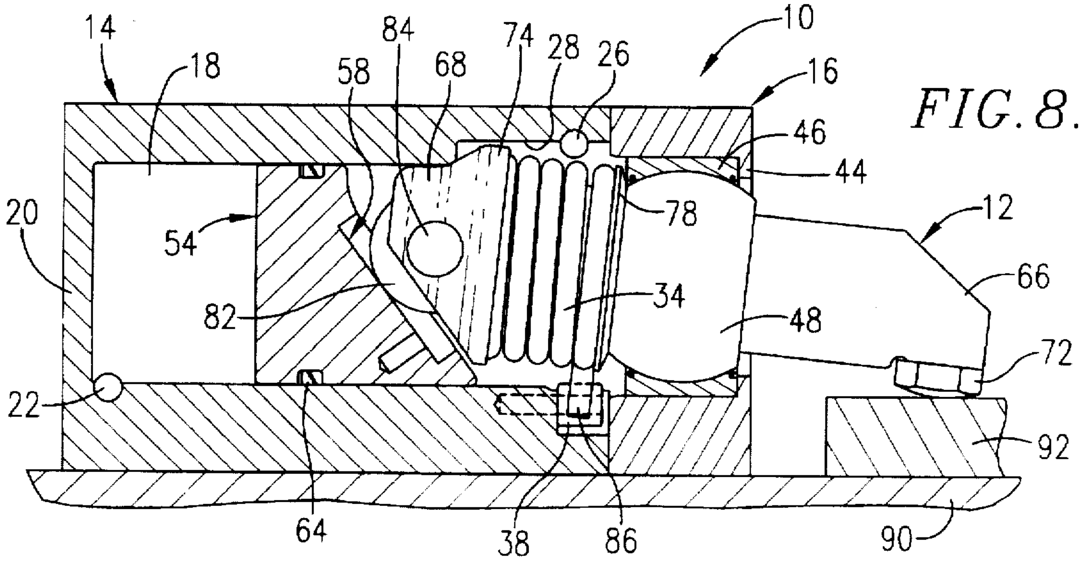
FIG. 8 is a sectional view similar to FIG. 6, illustrating the piston and arm assembly in a fully extended position.

As shown in FIG. 2, the outer circumferential surface of the piston includes a groove sized for receipt of a seal 64 that seals the piston 54 against the inner surface of the body 14 to define a closed, fluid-tight chamber within the body adjacent the rear face of the piston. The port 22 communicates with this chamber for supplying hydraulic fluid under pressure to the chamber to drive the piston 54 from a retracted position, as shown in FIG. 6, to an extended position, shown in FIG. 8.

The arm is formed of steel or other suitable metal and, as shown in FIG. 2, includes a front portion 66 that protrudes from the body 14, and an opposed rear portion 68 disposed within the bore. The front portion 66 is of uniform diameter, presenting a distal tip that is tapered. A threaded hole 70 extends vertically through the tip and receives a bolt 72 having a head that engages the work piece when the arm is extended and lowered against a work piece. By using the bolt 72, it is possible to adjust the position of the head relative to the arm, and to easily replace the bolt, if necessary.

The rear portion 68 of the arm presents a circumferential flange 74 having an outer diameter greater than the outer diameter of the front portion of the arm and sized for sliding receipt within the bore of the body. The outer circumferential surface of the arm between the flange and a rear end of the arm is tapered to present a ramp for guiding movement of the arm over the edge of the recess when the arm is shifted between the retracted position, shown in FIG. 6, and the extended position, shown in FIG. 8. The flange 74 defines a front end face that is provided with a groove 76, as shown in FIG. 6, within which the spring 34 is seated. Another spring seat 78 is supported on the arm 12 and abuts the bearing 48 such that the spring is supported between the seat 78 and the flange 74, and biases the arm toward the retracted position. The seat 78 is an annular element presenting a circumferential flange that seats the spring.

Figure 7:
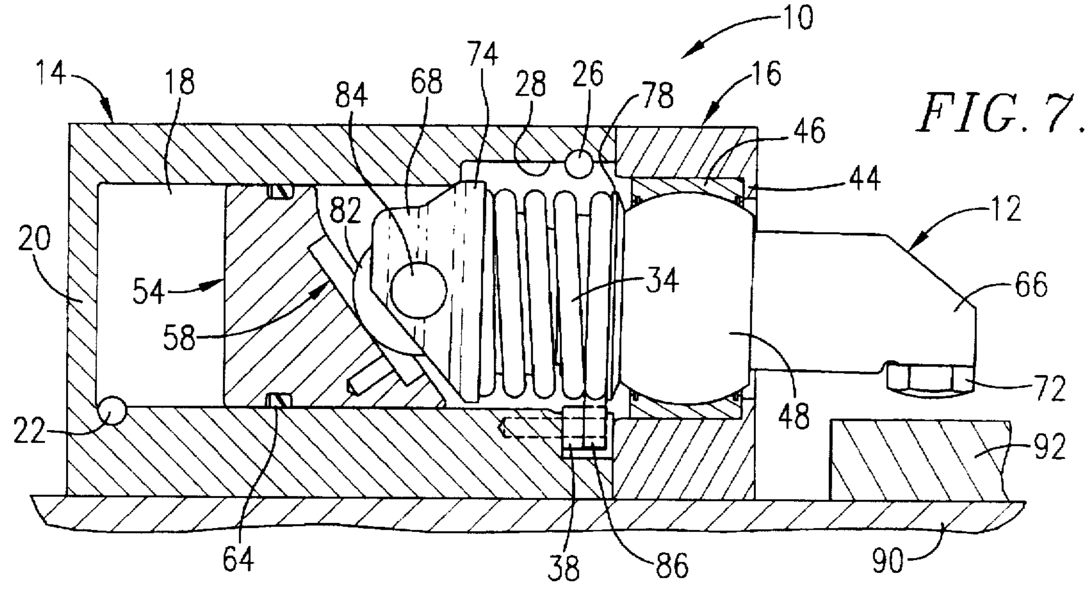
FIG. 7 is a sectional view similar to FIG. 6, illustrating the piston and arm assembly in a partially extended position.

Returning to FIG. 2, a slot 80 extends into the arm 12 from the rear end, and diametrically through the arm, dividing the rear portion 68 of the arm into two legs. As shown in FIG. 7, a transverse hole extends through the rear portion and intersects the slot at a right angle. As illustrated in FIG. 2, the slot 80 is sized for receipt of a roller 82, and a shaft 84, shown in FIG. 6, is received in the hole to support the roller 82 for rotation relative to the arm. The width of the roller is not only accommodated within the slot, but also within the race 58 formed in the front face of the piston 54. Thus, the roller 82 engages the piston to transmit linear movement of the piston to the arm. In addition, due to the incline formed in front face of the piston and the race 58, an oblique force is also exerted on the arm through the roller which forces the arm to pivot with the bearing 48 as the flange 74 of the arm enters the recess 28 in the body. The resulting action of the arm is a linear shifting movement along a large portion of the movement of the piston toward the extended position, and an additional pivoting motion along the last small portion of movement of the arm.

The compression spring 34 is received on the arm, and includes the front end 86 that protrudes radially of the coil defined by the spring, as shown in FIG. 3, and a rear end 88 that turns radially inward and terminates in a short, circumferentially extending section of a diameter smaller than the diameter of the coil, as shown in FIG. 2. Returning to FIG. 3, the front end 86 is received in the cutout 30 and is held in place circumferentially by the pins 36 and bushings 38. The plurality of holes 32, shown in FIG. 5, permit the orientation of the spring, and thus the arm, to be adjusted relative to the body during assembly. Once the spring is properly oriented, the pins and bushings are inserted into the appropriate holes to secure the front end of the spring against further movement. As shown in FIG. 2, the rear end of the spring fits in the slot and is thus held against circumferential movement by the legs defined by the rear portion of the arm.

During use, with the apparatus secured to a fixture 90 with the lower mounting surface of the body flush against the support surface of the fixture, the apparatus is normally retained in the retracted position, as shown in FIG. 6, with fluid pressure relieved from the body 14 and the piston 54 and arm 12 biased into the retracted position by the spring 34. Once a work piece 92 is positioned on the support surface of the fixture 90, hydraulic fluid is supplied under pressure to the body, forcing the piston 54 against the bias of the spring 34 toward the extended position. The piston engages the roller 82, shifting the arm 12 along with the piston, and both move together along the longitudinal axis of the bore.

As the flange 74 of the arm reaches the recess 28, as shown in FIG. 7, the oblique force exerted on the arm by the front face 56 and race 58 of the piston moves the arm up into the recess, causing the arm to pivot about a pivot axis defined by the bearing 48 and race 46. The longitudinal and pivotal movement of the arm are both accommodated by the bearing 48 and race 46, guiding the front portion of the arm outward and downward toward the work piece 92.

As the flange 74 continues to be moved into the recess 28, the arm 12 moves out and down over the work piece 92, engaging the piece and pinching it against the support surface of the fixture 90. By maintaining the pressure of the fluid supplied to the body, the clamping force on the work piece is also maintained.

To release the work piece, pressure to the body is relieved and the spring 34, which pivots with the arm 12 during movement of the flange 74 into and out of the recess 28, forces the arm and piston to the retracted position. The ramp-shaped outer surface of the arm along the rear side of the flange 74 guides the flange out of the recess so that it does not get caught up on the edge of the recess without returning to the retracted position.

Although the present invention has been described with reference to the preferred embodiment, it is noted that equivalents may be employed and substitution made herein without departing from the scope of the invention as recited in the claims.

What is claimed is:

1. A retract clamp apparatus for supporting a work piece on a fixture, the clamp apparatus comprising:

a body including a mounting surface adapted to be supported on the fixture, and a longitudinally extending bore defining a central longitudinal axis that is parallel to the mounting surface;

a piston received in the bore for relative longitudinal movement between a retracted position and an extended position;

an elongated arm presenting an outer end adapted to engage the work piece supported on the fixture and an inner end adapted to engage the piston;

a mounting assembly for mounting the arm on the body for longitudinal movement with the piston and for pivotal movement about a pivot axis that is transverse to the central longitudinal axis and parallel to the mounting surface;

a shifting means for shifting the piston and arm back and forth between the retracted and extended positions; and a circumferentially extending, arcuate recess formed in the body in communication with the bore for preventing the arm from pivoting relative to the body in the retracted position and for permitting limited pivoting of the arm about the pivot axis when the arm is shifted longitudinally a predetermined distance toward the extended position;

the piston including a front face that engages the arm, the front face being oblique relative to the longitudinal axis to force the arm into the recess when the arm is shifted longitudinally the predetermined distance toward the extended position.

2. A retract clamp apparatus as recited in claim 1, further comprising a roller supported on the inner end of the arm for rotation about an axis that is parallel to the pivot axis, the front face of the piston engaging the roller and being disposed in a plane that is parallel to the pivot axis so that the roller rolls on the front face of the piston when the arm pivots about the pivot axis.

3. A retract clamp apparatus for supporting a work piece on a fixture, the clamp apparatus comprising:

a body including a mounting surface adapted to be supported on the fixture, and a longitudinally extending bore defining a central longitudinal axis that is parallel to the mounting surface;

a piston received in the bore for relative longitudinal movement between a retracted position and an extended position;

an elongated arm presenting an outer end adapted to engage the work piece supported on the fixture and an inner end adapted to engage the piston;

a mounting assembly for mounting the arm on the body for longitudinal movement with the piston and for pivotal movement about a pivot axis that is transverse to the central longitudinal axis and parallel to the mounting surface;

a shifting means for shifting the piston and arm back and forth between the retracted and extended positions;

the body including a circumferentially extending, arcuate recess in communication with the bore for preventing the arm from pivoting relative to the body in the retracted position and for permitting limited pivoting of the arm about the pivot axis when the arm is shifted longitudinally a predetermined distance toward the extended position;

the piston including a front face that engages the arm, the front face being oblique relative to the longitudinal axis to force the arm into the recess when the arm is shifted longitudinally the predetermined distance toward the extended position;

a roller supported on the inner end of the arm for rotation about an axis that is parallel to the pivot axis, the front face of the piston engaging the roller and being disposed in a plane that is parallel to the pivot axis so that the roller rolls on the front face of the piston when the arm pivots about the pivot axis; and a spring received within the bore for forcing the piston towards the extended position, wherein the spring includes a first end that is secured against rotation relative to the body and a second end that is secured against rotation relative to the arm such that the arm is prevented by the spring from rotating within the body.

4. A retract clamp apparatus as recited in claim 1, wherein the mounting assembly includes a tubular bearing having a spherical outer surface, and a tubular race having a spherical inner surface sized for receipt of the spherical outer surface of the bearing to permit universal pivoting movement of the bearing within the race, the arm being supported within the tubular bearing for relative longitudinal movement.

5. A retract clamp apparatus as recited in claim 4, further comprising a first spring seat supported on the bearing and a second spring seat supported on the arm, the spring being supported between the first and second seats so that the spring pivots with the arm relative to the body and biases the arm toward the retracted position.

6. A retract clamp apparatus for supporting a work piece on a fixture, the clamp apparatus comprising:

a body including a mounting surface adapted to be supported on the fixture, and a longitudinally extending bore defining a central longitudinal axis that is parallel to the mounting surface;

a piston received in the bore for relative longitudinal movement between a retracted position and an extended position;

an elongated arm presenting an outer end adapted to engage the work piece supported on the fixture and an inner end adapted to engage the piston;

a mounting assembly for mounting the arm on the body for longitudinal movement with the piston and for pivotal movement about a pivot axis that is transverse to the central longitudinal axis and parallel to the mounting surface;

a shifting means for shifting the piston and arm back and forth between the retracted and extended positions;

the body including a circumferentially extending, arcuate recess in communication with the bore for preventing the arm from pivoting relative to the body in the retracted position and for permitting limited pivoting of the arm about the pivot axis when the arm is shifted longitudinally a predetermined distance toward the extended position;

the piston including a front face that engages the arm, the front face being oblique relative to the longitudinal axis to force the arm into the recess when the arm is shifted longitudinally the predetermined distance toward the extended position; and a roller supported on the inner end of the arm for rotation about an axis that is parallel to the pivot axis, the front face of the piston engaging the roller and being disposed in a plane that is parallel to the pivot axis so that the roller rolls on the front face of the piston when the arm pivots about the pivot axis;

wherein the front face of the piston includes an elongated channel within which the roller is received, the channel guiding rolling movement of the roller on the front face of the piston when the arm pivots about the pivot axis.

* * * * *